United States Patent [19]

Asoma et al.

[11] Patent Number: 5,461,224

[45] Date of Patent: Oct. 24, 1995

[54] OPTICAL PICK-UP DEVICE HAVING LIGHT SPLITTING MEANS AND FOCUS ERROR AND TRACKING ERROR DETECTION

[75] Inventors: Yoshito Asoma, Saitama; Yoshiyuki Matsumoto, Tokyo, both of Japan

[73] Assignee: Sony Corporation, Tokyo, Japan

[21] Appl. No.: 177,913

[22] Filed: Jan. 6, 1994

[30] Foreign Application Priority Data

Jan. 25, 1993 [JP] Japan ................................. 5-028553

[51] Int. Cl.⁶ ................................................. G11B 7/09
[52] U.S. Cl. ........................ 250/201.5; 369/44.41
[58] Field of Search ......................... 250/201.5, 2.6, 250/201.8; 369/44.23, 44.32, 44.11, 44.12, 44.14, 44.32, 44.33, 44.34, 44.41, 44.42

[56] References Cited

U.S. PATENT DOCUMENTS

| | | | |
|---|---|---|---|
| 4,667,316 | 5/1987 | Suda et al. | 250/201.5 |
| 5,233,444 | 8/1993 | Musha et al. | 250/201.5 |
| 5,293,038 | 3/1994 | Kadowaki et al. | 369/44.23 |
| 5,317,144 | 5/1994 | Oono et al. | 250/201.5 |

FOREIGN PATENT DOCUMENTS

| | | | |
|---|---|---|---|
| 0244827A3 | 11/1987 | European Pat. Off. | G11B 7/12 |
| 0270874A2 | 6/1988 | European Pat. Off. | G11B 7/12 |
| 0311340A2 | 4/1989 | European Pat. Off. | G11B 7/13 |

Primary Examiner—Edward P. Westin
Assistant Examiner—John R. Lee
Attorney, Agent, or Firm—Limbach & Limbach

[57] ABSTRACT

In an optical pick-up device, a first photodetector is disposed in such a position as to detect a light beam which is part of a light beam reflected from an optical disk and split in a direction different from a light source direction, and a second photodetector is disposed in the vicinity of the light source so that it can detect a light beam which is the other part of the light beam reflected from the optical disk and split in the light source direction, wherein a tracking control signal and a reproducing signal are detected by the first photodetector and a focusing control signal is detected by the second photodetector.

7 Claims, 2 Drawing Sheets

OPTICAL PICK-UP DEVICE HAVING LIGHT SPLITTING MEANS AND FOCUS ERROR AND TRACKING ERROR DETECTION

BACKGROUND OF THE INVENTION

1. Field of the Invention

The present invention relates to an optical pick-up device for use in an optical disk apparatus such as a magneto-optical disk recording and reproducing apparatus.

2. Description of Related Art

An optical pick-up device for use in a magneto-optical disk apparatus has been conventionally designed as shown in FIG. 1. In FIG. 1, an optical pick-up device 1 includes a laser beam source 2 such as a semiconductor laser element or the like and a prism 3 having a reflecting surface for reflecting a laser beam emitted from the laser beam source 2 in such a direction that the optical path of the laser beam is bent vertically from the surface of the drawing by 90 towards the viewer. The optical pick-up device 1 further includes an objective lens (not shown) which is provided just before the prism 3, a grating 4, a beam splitter 5 and a collimator lens 6 which are disposed, in the order given, between the laser beam source 2 and the prism 3, a composite lens 7 and a cylindrical lens 8 which are disposed at the lower side of the beam splitter 5 in FIG. 1, and a photodetector 9 disposed at the lower side of the cylindrical lens 8.

In the pick-up device 1 thus constructed, the laser beam emitted from the laser beam source 2 passes through the grating 4, the beam splitter 5 and the collimator 6 and is reflected from the prism 3. The laser beam reflected from the prism 3 passes through the objective lens (not shown) and is focused on the surface of a magneto-optical disk (not shown).

The laser beam is reflected from the surface of the magneto-optical disk, passes through the objective lens again, is reflected from the prism 3, and then travels along a return optical path. This reflected laser beam passes through the collimator lens 6 and then enters the beam splitter 5. The laser beam which is reflected from the magneto-optical disk and then enters the beam splitter 5 is reflected from a reflecting surface 5a of the beam splitter 5 and into the photodetector 9 via the composite lens 7 and the cylindrical lens 8. Upon receiving this reflected laser beam, the photodetector 9 detects a focusing control signal, a tracking control signal and a reproduction signal.

In the pick-up device 1, the focusing control signal, the tracking control signal and the reproduction signal are all detected by the photodetector 9. Among these signals, the focusing control signal in particular requires accurate positioning between the photodetector 9 and the reflected laser beam. Accordingly, the photodetector 9 must be accurately positioned, and this requirement makes fabrication of the pick-up device more troublesome.

Further, environmental variations in characteristics and performance such as variations in temperature, time lapse variations, etc. cause positional deviations of the relative positional relationship between the optical axis of the photodetector 9 and the center of the laser beam. Positional deviation between the optical axis of the photodetector 9 and the center of the reflected laser beam obstructs the achievement of accurate focusing control.

Still further, the reflected laser beam on the light-receiving surface of the photodetector 9 has a spot size of several tens of microns, so that the photodetector 9 itself is relatively large in size. Accordingly, the degree of freedom with which the photodetector 9 is arranged in the pick-up device is lowered, with the result that the pick-up device as a whole cannot be significantly reduced in size.

SUMMARY OF THE INVENTION

An object of the present invention is to provide an optical pick-up device for a magneto-optical disk apparatus which can be designed to be compact and in which deterioration of the focusing precision thereof, due to environmental characteristic and performance variations such as temperature variations, time lapses, etc., is prevented.

In order to attain the above object, the optical pick-up device according to the present invention includes a light source for emitting a light beam, light splitting means for guiding the light beam emitted from the light source toward an optical disk and splitting the light beam reflected from the optical disk into a first light beam propagating toward the light source and a second light beam propagating in a direction different from that of the first light beam, a first photodetector disposed near to the light source for detecting the first light beam from the light splitting means to detect a focus error, and a second photodetector for detecting the second light beam from the light splitting means to detect a tracking error.

The first photodetector is preferably designed to be integral with the light source. Further, the optical pick-up device is preferably equipped with second light splitting means for guiding the light beam emitted from the light source to the first light splitting means and guiding the first light beam split by the first light splitting means to the first photodetector.

According to the optical pick-up device thus constructed, the first photodetector for focusing is disposed in the vicinity of the light source, and the reflected light beam is partially reflected and enters the second photodetector in the light splitting optical system. The first photodetector detects the tracking control signal and the reproduction signal on the basis of the light beam incident thereon.

The reflected light beam is transmitted through the light splitting optical system, and one part thereof travels to the light source and is incident on the first photodetector. The first photodetector detects the focusing control signal on the basis of the incident light beam. At this time, the reflected light beam converges toward the light source, with the result that the reflected light beam has no relative positional deviation to the first photodetector due to temperature variation, time-lapse variation, etc.

Further, when the second photodetector is designed integrally with the light source, it becomes unnecessary to position the second photodetector itself.

DETAILED DESCRIPTION OF PREFERRED EMBODIMENTS

A preferred embodiment according to the present invention will be described in detail with reference to FIGS. 2 and 3.

The following embodiment is a preferred embodiment of the present invention, and various limitations which are technically preferable are employed in this embodiment. However, the present invention is not limited to the following description with the exception of specific limitations disclosed therein.

Figure 1:
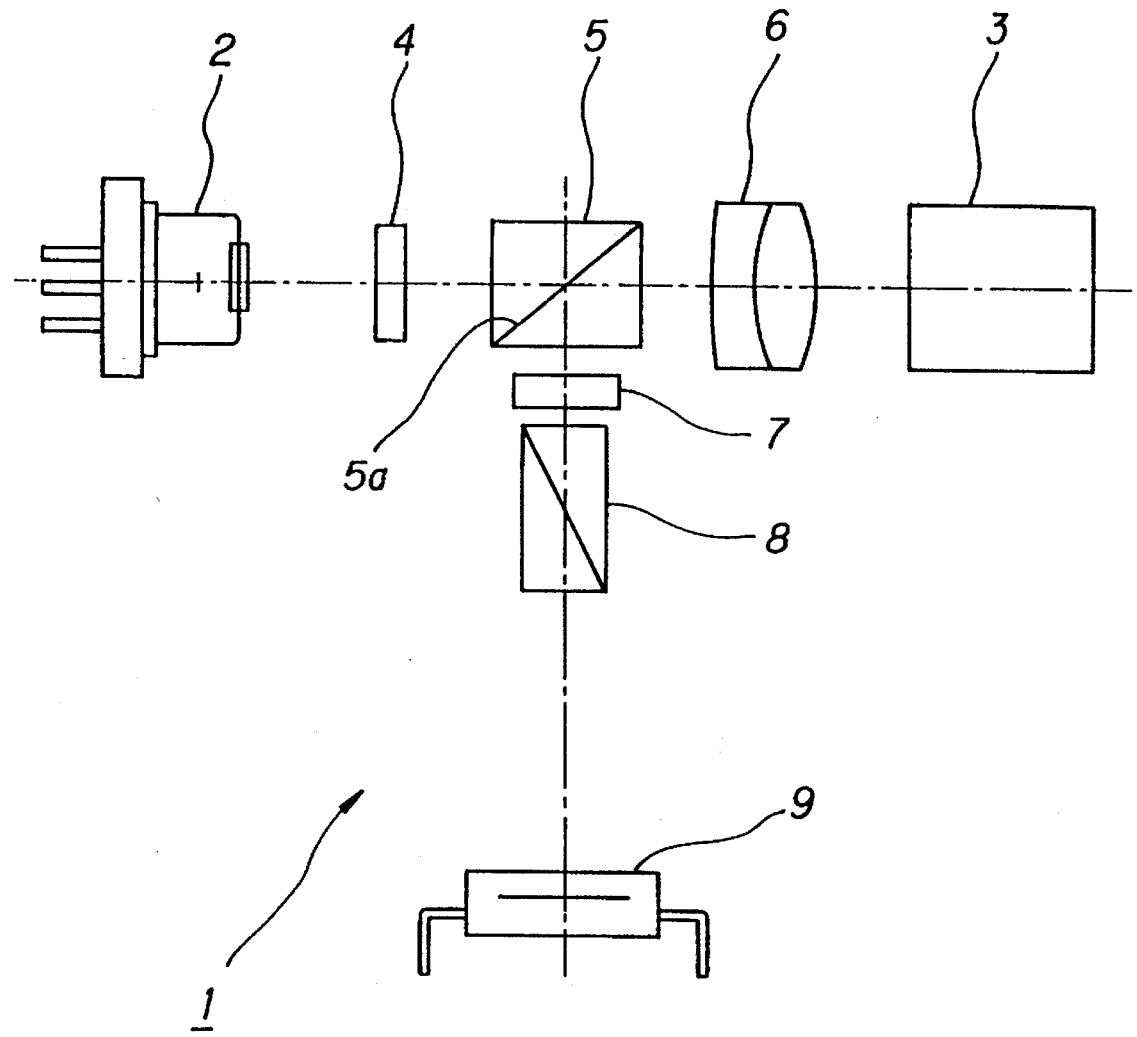
FIG. 1 is a schematic plan view showing the construction of a conventional optical pick-up device.
Figure 2:
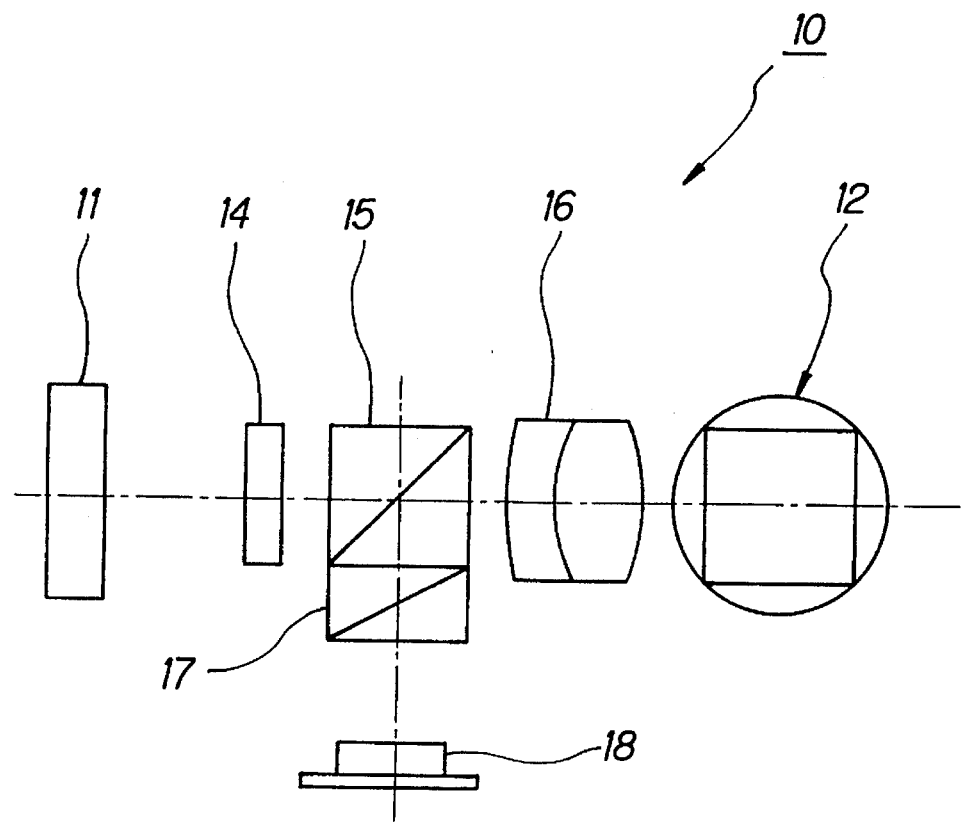
FIG. 2 is a schematic plan view showing the construction of an embodiment of an optical pick-up device according to the present invention.
Figure 3:
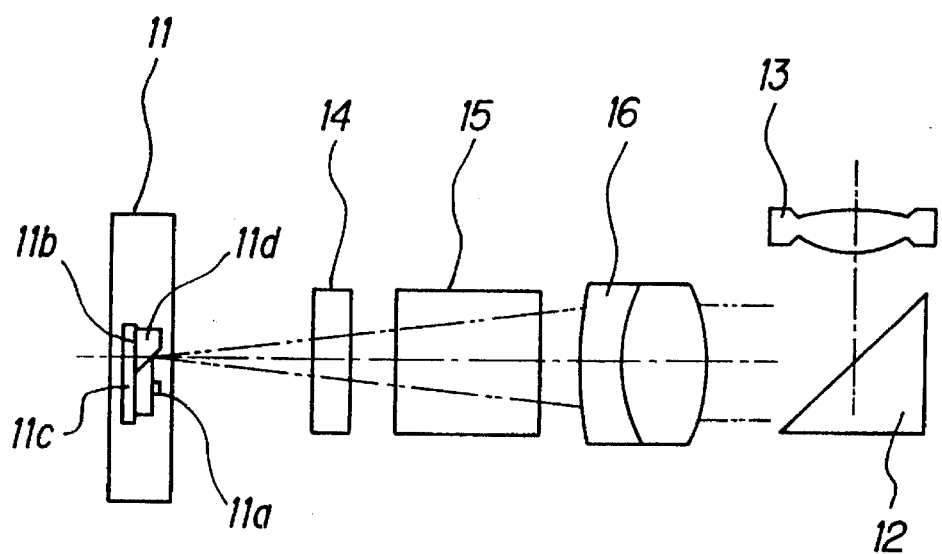
FIG. 3 is a schematic side view showing the optical pick-up device as shown in FIG. 2.

FIGS. 2 and 3 are plan and side views of an embodiment of the optical pick-up device of the present invention.

In FIGS. 2 and 3, an optical pick-up device 10 includes a laser beam source 11 such as a semiconductor laser element or the like, and a prism 12 having a reflecting surface for reflecting a laser beam emitted from the laser beam source 2 in a direction toward the viewer in FIG. 2, that is, in an upward direction in FIG. 3.

The optical pick-up device 10 further includes an objective lens 13 which is provided just before the prism 12 (at the upper side of the prism 12 in FIG. 3), a grating 14, a beam splitter 15 and a collimator lens 16 which are disposed, in that order, between the laser beam source 11 and the prism 12, a Wollaston prism 17 disposed at the lower side of the beam splitter 15 and a photodetector 18 disposed at the lower side of the Wollaston prism 17.

The light-receiving surface of the photodetector 18 is so designed that the reflected light beam split by the beam splitter 15 is incident on the light-receiving surface. The photodetector 18 functions to detect the tracking control signal and the reproducing signal on the basis of the received reflected light beam.

In this embodiment, the laser beam source 11 is preferably designed as a so-called laser coupler which is used in pick-up devices for CD players. For example, as shown in FIG. 3, a focusing photodetector 11b is disposed in the neighborhood of a semiconductor laser 11a as a light emitting source. In this case, the semiconductor laser 11a and the focusing photodetector 11b are integrally secured on a chassis 11c, and are optically coupled to each other through a light-flux separating prism 11d.

The optical pick-up device 10 according to the present invention is designed as described above. The operation thereof will be now described.

The light beam emitted from the semiconductor laser 11a of the laser light source 11 is split into three light beams by the grating 14, passes through the beam splitter 15 and the collimator lens 16, and is reflected from the prism 12. Thereafter, the light beam passes through the objective lens 13, and is focused onto the surface of a magneto-optical disk (not shown).

The light beam reflected from the surface of the magneto-optical disk then passes through the objective lens 13 again, is reflected from the prism 12 in such a manner that the optical path thereof is bent by 90°, and then propagates along the return optical path. This reflected light beam passes through the collimator lens 16, and enters the beam splitter 15. In the beam splitter 15, a part of the reflected light beam is reflected from the reflection surface 15a of the beam splitter 15, and the other part of the reflected light beam is directly transmitted through the beam splitter 15.

The reflected beam which is transmitted through the beam splitter 15 passes through the grating 14 again, enters the light-flux separating prism 11d, and converges toward the focusing photodetector 11b at the same time as it is being guided towards the same.

The focusing photodetector 11b functions so as to detect the focusing control signal on the basis of the received reflected light beam. The focusing control signal is subjected to suitable processing in a control circuit (not shown) to control the position of the objective lens 13 so that the light beam is focused on the surface of the magneto-optical disk.

Meanwhile, the reflected light beam which is reflected from the beam splitter 15 passes through the Wollaston prism 17 and enters the photodetector 18. Through this operation, the photodetector 18 detects the tracking control signal and the reproducing signal on the basis of the received reflected light beam.

The tracking control signal is subjected to suitable processing in the control circuit (not shown) to adjust the position of the optical pick-up device so that the light beam is aligned with a track position on the magneto-optical disk. The reproducing signal is subjected to suitable processing in the control circuit (not shown) and it is used as a data signal or the like.

As described above, in the optical, pick-up device of the present embodiment, the second photodetector is disposed in the vicinity of the light source. Accordingly, the light beam emitted from the light source is reflected from the surface of the magneto-optical disk, and then returns to the light source. Therefore, deviation in the relative position of the reflected light to the photodetector, which is caused by environmental variations such as temperature variations, time-lapse variations, etc. in the prior art, does not occur. Accordingly, accurate focusing detection can be performed.

The second photodetector can be designed to have a relatively small light-receiving surface because the reflected beam to be detected converges on the light-receiving surface of the second photodetector, and thus the photodetector itself can be compact in size. Accordingly, no limitation is imposed on the arrangement of the device, and thus the degree of freedom setting up the device is improved.

The reflected light beam which is reflected from the light splitting optical system and then incident on the first photodetector is used to detect the tracking control signal and the reproducing signal. Accordingly, accurate positioning thereof is unnecessary, and thus the optical splitting optical system and the light-receiving optical system are easy to fabricate.

Further, accurate positioning and convergence of the light beam with respect to the first photodetector are not required for the light splitting optical system. Accordingly, a complicated lens structure is not required, and thus the whole construction of the light splitting optical system can be simplified. In addition, since the optical length is shortened, the light splitting optical system can be disposed in the vicinity of the first photodetector, and thus the entire construction of the device can be miniaturized.

Still further, when the second photodetector is designed integrally with the light source, positioning of the second photodetector itself is not required. In this case, since a laser coupler for a CD player is used, fabrication of the device can be more easily facilitated, and the cost of the device can be lowered.

What is claimed is:

1. An optical pick-up device, including:

a light source for emitting a light beam;

first light splitting means for guiding the light beam emitted from said light source toward an optical disk and splitting the light beam reflected from the optical disk into a first light beam propagating toward said light source and a second light beam propagating in a direction not toward said light source;

a first photodetector means disposed in proximity to said light source for detecting the first light beam from said light splitting means to detect a focus error; and a second photodetector means for detecting the second light beam from said light splitting means to detect a tracking error.

2. The optical pick-up device as claimed in claim 1, wherein said first photodetector means is formed integrally with said light source.

3. The optical pick-up device as claimed in claim 1, further including second light splitting means for guiding the light beam emitted from said light source to said first light splitting means and guiding the first light beam split by said first light splitting means to said first photodetector means.

4. An optical pick-up device, comprising:

a light source for emitting a light beam;

first light splitting means for guiding the light beam emitted from said light source toward an optical disk and splitting the light beam reflected from the optical disk into a first split light beam propagating toward said light source and a second split light beam propagating in a direction not toward said light source;

a first photodetector means formed integrally with said light source for detecting the first split light beam from said first light splitting means to detect a focus error;

a second photodetector means for detecting the second split light beam from said first light splitting means to detect a tracking error and to produce a reproducing signal.

a first prism means for directing the light beam from said first light splitting means to said disk, and for directing the reflected light beam from said disk to said first light splitting means;

a second prism means for directing said second split light beam from said first light splitting means to said second photodetector means; and a second light splitting means for guiding the light beam emitted from said light source to said first light splitting means, and for guiding the first split light beam from said first light splitting means to said first photodetector means.

5. An optical pickup device as recited in claim 4 further comprising a collimator means for collimating the light beam from the first light splitting means to the first prism means.

6. An optical pickup device as recited in claim 5 wherein said second prism means is a Wollaston prism.

7. An optical pickup device as recited in claim 5 wherein said second light splitting means is a grating.

* * * * *